(12) United States Patent
Brundridge et al.

(10) Patent No.: US 9,519,607 B2
(45) Date of Patent: *Dec. 13, 2016

(54) METHODS AND SYSTEMS FOR VIRTUALIZATION OF STORAGE SERVICES IN AN INTEGRATED CHASSIS

(71) Applicant: Dell Products L.P., Round Rock, TX (US)

(72) Inventors: Michael A. Brundridge, Georgetown, TX (US); Babu Chandrasekhar, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 234 days.

This patent is subject to a terminal disclaimer.

(21) Appl. No.: 14/462,153

(22) Filed: Aug. 18, 2014

(65) Prior Publication Data
US 2014/0359194 A1    Dec. 4, 2014

Related U.S. Application Data

(63) Continuation of application No. 13/442,727, filed on Apr. 9, 2012, now Pat. No. 8,838,871.

(51) Int. Cl.
*G06F 13/00* (2006.01)
*G06F 13/40* (2006.01)
*H04L 12/933* (2013.01)

(52) U.S. Cl.
CPC .......... *G06F 13/4022* (2013.01); *H04L 49/15* (2013.01)

(58) Field of Classification Search
CPC ..................................................... G06F 3/067
USPC ......................................................... 710/316
See application file for complete search history.

(56) References Cited

U.S. PATENT DOCUMENTS

| | | |
|---|---|---|
| 6,018,779 A | 1/2000 | Blumenau |
| 6,604,155 B1 | 8/2003 | Chong, Jr. |
| 6,788,690 B2 | 9/2004 | Harri |
| 6,876,656 B2 | 4/2005 | Brewer et al. |
| 6,980,543 B1 | 12/2005 | Kastenholz et al. |
| 7,360,010 B2 | 4/2008 | Ghaffari et al. |

(Continued)

FOREIGN PATENT DOCUMENTS

WO    WO 01/16763 A1    3/2001

OTHER PUBLICATIONS

International Search Report and Written Opinion: PCT/US2011/035228; 13 pages, Aug. 9, 2013.

*Primary Examiner* — Paul R Myers
(74) *Attorney, Agent, or Firm* — Jackson Walker L.L.P.

(57) ABSTRACT

In accordance with embodiments of the present disclosure, a system may include a chassis, one or more chassis management controllers housed in the chassis, and a switch management controller. The chassis may be configured to receive a plurality of modular information handling systems. The one or more chassis management controllers may be configured to receive a storage management command, encapsulate the storage management command in a first datagram, and communicate the first datagram to a switch management controller housed in the chassis. The switch management controller may be configured to extract the storage management command from the first datagram, identify a storage controller associated with the storage management command, and communicate an input/output control request to the storage controller based on the storage management command.

20 Claims, 2 Drawing Sheets

(56) References Cited

U.S. PATENT DOCUMENTS

| | | |
|---|---|---|
| 7,676,666 B2 | 3/2010 | Lambert et al. |
| 7,685,342 B2 | 3/2010 | Shiraki et al. |
| 7,788,717 B2 | 8/2010 | Merkin |
| 8,824,466 B2 * | 9/2014 | Won .................. H04L 43/12 370/249 |
| 2009/0089295 A1 | 4/2009 | Lambert et al. |
| 2012/0063304 A1 | 3/2012 | Gnanasckaran et al. |

* cited by examiner

METHODS AND SYSTEMS FOR VIRTUALIZATION OF STORAGE SERVICES IN AN INTEGRATED CHASSIS

The present patent application is a continuation of a previously filed patent application, U.S. patent application Ser. No. 13/442,727, filed Apr. 9, 2012, the entirety of which is hereby incorporated by reference. Pursuant to 37 CFR §1.78(a)(3), an application data sheet containing a reference to the previously filed application, unless submitted previously, is submitted contemporaneously herewith.

TECHNICAL FIELD

The present disclosure relates in general to information handling systems, and more particularly to virtualization of storage services in an integrated chassis.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Existing server architectures either provide a single monolithic server capable of running one operating system and input/output (I/O) resources at a time, or bulky blade server chassis providing multiple servers and I/O control modules in a single chassis. A system chassis with multiple information handling systems with various peripheral and input/output capabilities common to the chassis as a whole may provide advantages, as it allows a blade server chassis in a small form factor, thereby providing a blade server chassis with a size comparable to the size of a monolithic server. Implementation of a system chassis with multiple information handling systems with various peripheral and input/output capabilities common to the chassis as a whole presents numerous challenges.

SUMMARY

In accordance with the teachings of the present disclosure, the disadvantages and problems associated with virtualizing storage services in an integrated chassis have been reduced or eliminated.

In accordance with embodiments of the present disclosure, a system may include a chassis, one or more chassis management controllers housed in the chassis, and a switch management controller. The chassis may be configured to receive a plurality of modular information handling systems. The one or more chassis management controllers may be configured to receive a storage management command, encapsulate the storage management command in a first datagram, and communicate the first datagram to a switch management controller housed in the chassis. The switch management controller may be configured to extract the storage management command from the first datagram, identify a storage controller associated with the storage management command, and communicate an input/output control request to the storage controller based on the storage management command.

In accordance with these and other embodiments of the present disclosure, a method may include receiving a storage management command at a chassis management controller housed in a chassis configured to receive a plurality of modular information handling systems, encapsulating the storage management command in a first datagram, communicating the first datagram from the chassis management controller to a switch management controller housed in the chassis, extracting the storage management command from the first datagram, identifying a storage controller associated with the storage management command, and communicating an input/output control request from the switch management controller to the storage controller based on the storage management command.

Technical advantages of the present disclosure will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
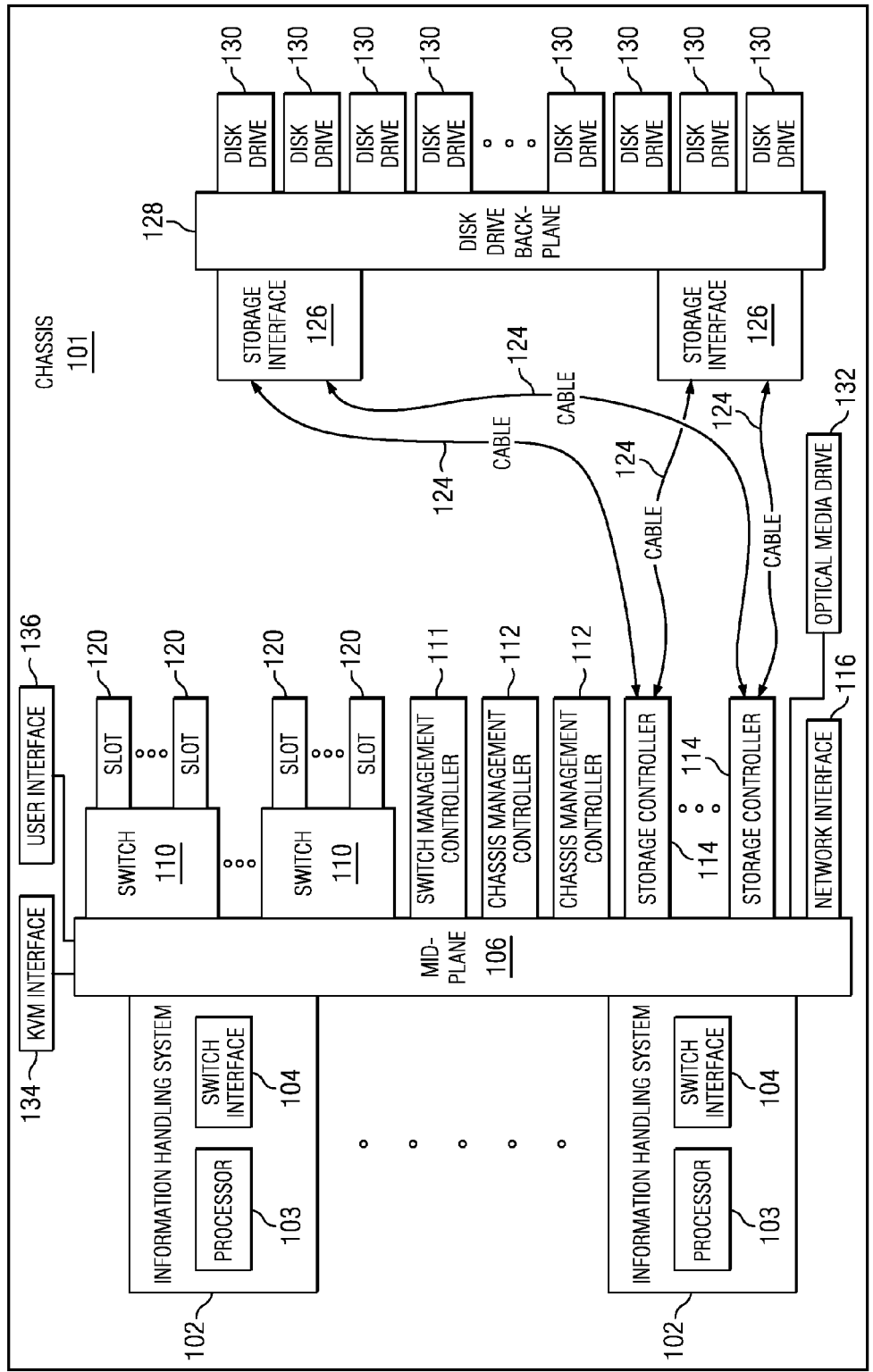
FIG. 1 illustrates a block diagram of an example system chassis with multiple information handling systems and with various peripheral and input/output capabilities common to the chassis as a whole, in accordance with certain embodiments of the present disclosure.
Figure 2:
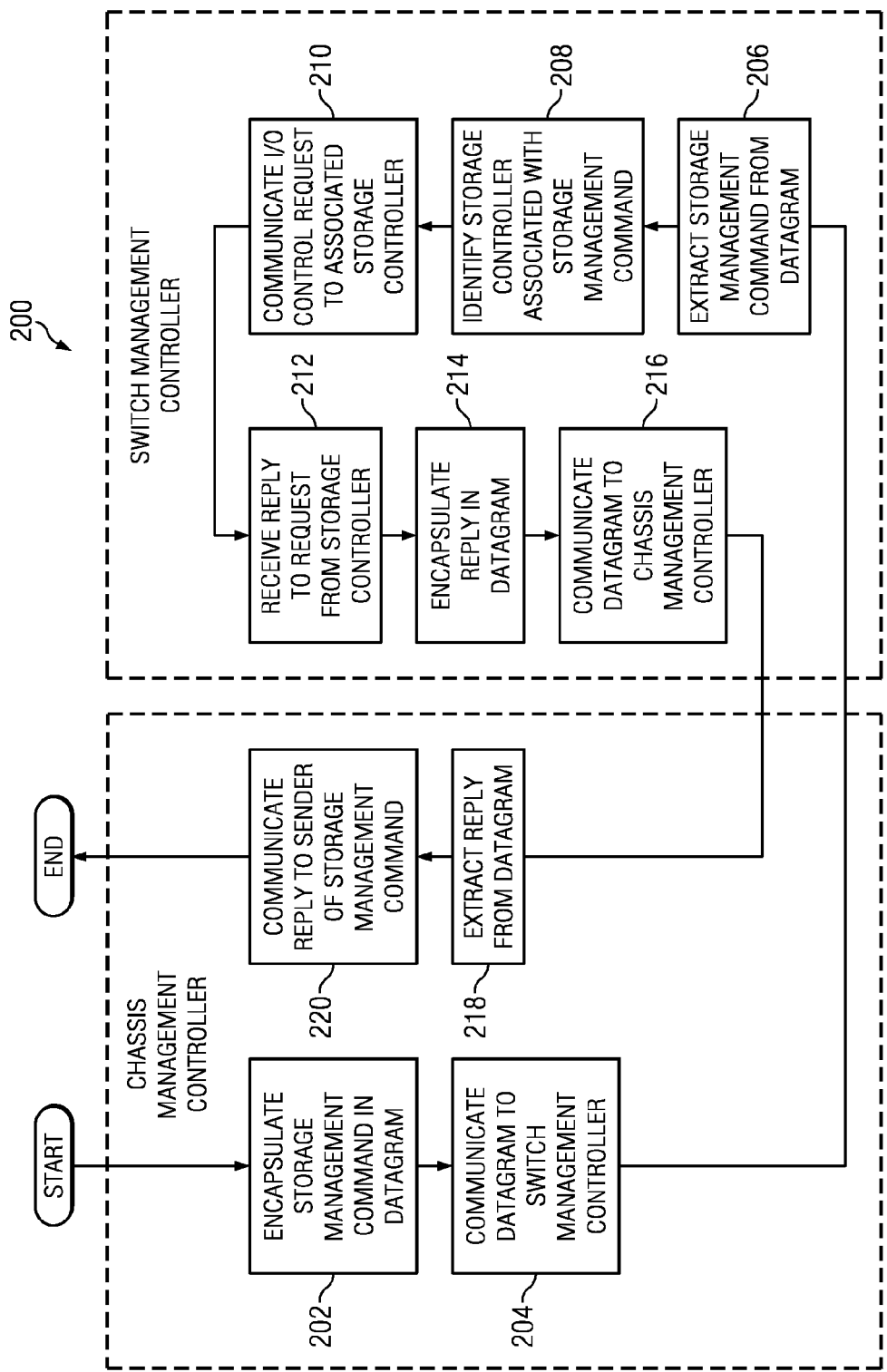
FIG. 2 illustrates a flow chart of an example method for virtualization of storage services in an intergrated chassis, in accordance with certain embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU)

or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, busses, memories, input-output devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

Information handling systems often use an array of physical storage resources (e.g., disk drives), such as a Redundant Array of Independent Disks (RAID), for example, for storing information. Arrays of physical storage resources typically utilize multiple disks to perform input and output operations and can be structured to provide redundancy which may increase fault tolerance. Other advantages of arrays of physical storage resources may be increased data integrity, throughput and/or capacity. In operation, one or more physical storage resources disposed in an array of physical storage resources may appear to an operating system as a single logical storage unit or "logical unit." Implementations of physical storage resource arrays can range from a few physical storage resources disposed in a chassis, to hundreds of physical storage resources disposed in one or more separate storage enclosures.

FIG. 1 illustrates a block diagram of an example system 100 having a chassis 101 with multiple information handling systems 102 and with various peripheral and input/output capabilities common to chassis 101 as a whole, in accordance with certain embodiments of the present disclosure. As depicted in FIG. 1, system 100 may comprise a chassis 101 including a plurality of information handling systems 102, a mid-plane 106, one or more switches 110, a switch management controller 111, one or more chassis management controller 112, a network interface 116, one or more slots 120, one or more cables 124, one or more storage interfaces 126, a disk drive backplane 128, a plurality of disk drives 130, an optical media drive 132, a keyboard-video-mouse (KVM) interface 134, and a user interface 136.

An information handling system 102 may generally be operable to receive data from and/or communicate data to one or more disk drives 130 and/or other information handling resources of chassis 101 via mid-plane 106. In certain embodiments, an information handling system 102 may be a server. In such embodiments, an information handling system may comprise a blade server having modular physical design. In these and other embodiments, an information handling system 102 may comprise an M class server. As depicted in FIG. 1, an information handling system 102 may include a processor 103 and one or more switch interfaces 104 communicatively coupled to the processor 103.

A processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in a memory, a hard drive 130, and/or another component of system 100.

A switch interface 104 may comprise any system, device, or apparatus configured to provide an interface between its associated information handling system 102 and switches 110. In some embodiments, switches 110 may comprise Peripheral Component Interconnect Express (PCIe) switches, in which case a switch interface 104 may comprise a mezzanine card configured to create a PCIe-compliant interface between its associated information handling system 102 and switches 110. In other embodiments, a switch interface 104 may comprise an interposer. Use of switch interfaces 104 in information handling systems 102 may allow for minimal changes to be made to traditional servers (e.g., M class servers) while supporting the overall system architecture disclosed herein. Although FIG. 1 depicts an implementation including a single switch interface 104 per information handling system 102, in some embodiments each information handling system 102 may include a plurality of switch interfaces 102 for redundancy, high availability, and/or other reasons.

Mid-plane 106 may comprise any system, device, or apparatus configured to interconnect modular information handling systems 102 with information handling resources of chassis 101. Accordingly, mid-plane 106 may include slots and/or connectors configured to receive information handling systems 102, switches 110, switch management controller 111, chassis management controllers 112, storage controllers 114, network interface 116, optical media drive 132, KVM interface 134, user interface 136, and/or other information handling resources. In one embodiment, mid-plane 106 may include a single board configured to interconnect modular information handling systems 102 with information handling resources. In another embodiment, mid-plane 106 may include multiple boards configured to interconnect modular information handling systems 102 with information handling resources. In yet another embodiment, mid-plane 106 may include cabling configured to interconnect modular information handling systems 102 with information handling resources.

A switch 110 may comprise any system, device, or apparatus configured to couple information handling systems 102 to storage controllers 114 (e.g., via mid-plane 106) and slots 120 and perform switching between information handling systems 102 and various information handling resources of system 100, including storage controllers 114 and slots 120. In certain embodiments, a switch 110 may comprise a PCIe switch. In other embodiments, a switch may comprise a generalized PC bus switch, an Infiniband switch, or other suitable switch. As shown in FIG. 1, chassis 101 may include a plurality of switches 110. In such embodiments, switches 110 may operate in a redundant mode for shared devices (e.g., storage controllers 114 and/or devices coupled to slots 120) and in non-redundant mode for non-shared/zoned devices. As used herein, shared devices may refer to those which may be visible to more than one information handling system 102, while non-shared devices may refer to those which are visible to only a single information handling system 102.

A chassis management controller 112 may be any system, device, or apparatus configured to facilitate management and/or control of system 100, its information handling systems 102, and/or one or more of its component its component information handling resources. A chassis management controller 102 may be configured to issue commands and/or other signals to manage and/or control information handling system 102 and/or information handling resources of system 100. A chassis management controller 112 may comprise a microprocessor, microcontroller, digital signal processor (DSP), application specific integrated circuit (ASIC), field programmable gate array (FPGA), erasable programmable read-only memory (EPROM), or any combination thereof. As shown in FIG. 1, a chassis management controller 112 may be coupled to mid-plane 106. Also as shown in FIG. 1, system 100 may include a plurality of chassis management controllers 112, and in such embodiments, chassis management controllers 112 may be configured as redundant. In some embodiments, a chassis management controller 112 may provide a user interface and high level controls for management of switches 110, including configuring assignments of individual information handling systems 102 to non-shared information handling resources of system 100. In these and other embodiments, a chassis management controller may define configurations of the storage subsystem (e.g., storage controllers 114, storage interfaces 126, disk drives 130, etc.) of system 100. For example, a chassis management controller may provide physical function configuration and status information that would normally occur at the driver level in traditional server implementations. Examples of physical functions include disk drive discovery and status, RAID configuration and logical volume mapping.

In addition or alternatively, a chassis management controller 112 may also provide a management console for user/administrator access to these functions. For example, a chassis management controller 112 may implement Intelligent Platform Management Interface (IPMI) or another suitable management protocol permitting a user to remotely access a chassis management controller 112 to configure system 100 and its various information handling resources. In such embodiments, a chassis management controller 112 may interface with a network interface separate from network interface 116, thus allowing for "out-of-band" control of 100, such that communications to and from chassis management controller 112 are communicated via a management channel physically isolated from an "in band" communication channel with network interface 116. Thus, for example, if a failure occurs in system 100 that prevents an administrator from interfacing with system 100 via network interface 116 and/or user interface 136 (e.g., operating system failure, power failure, etc.), the administrator may still be able to monitor and/or manage system 100 (e.g., to diagnose problems that may have caused failure) via a chassis management controller 112. In the same or alternative embodiments, chassis management controller 112 may allow an administrator to remotely manage one or parameters associated with operation of system 100 and its various information handling resources (e.g., power usage, processor allocation, memory allocation, security privileges, etc.). Although FIG. 1 depicts chassis as having two chassis management controllers 112, chassis 101 may include any suitable number chassis management controllers 112.

A storage controller 114 may and include any system, apparatus, or device operable to manage the communication of data between one or more of information handling systems 102 and one or more of disk drives 130. In certain embodiments, a storage controller 114 may provide functionality including, without limitation, disk aggregation and redundancy (e.g., RAID), input/output (I/O) routing, and error detection and recovery. As shown in FIG. 1, a storage controller 114 may coupled to a connector on mid-plane 106. Also as shown in FIG. 1, system 100 may include a plurality of storage controllers 114, and in such embodiments, storage controllers 114 may be configured as redundant. In addition or in the alternative, storage controllers 114 may in some embodiments be shared among two or more information handling systems 102. As also shown in FIG. 1, each storage controller 114 may be coupled to one or more storage interfaces 126 via cables 124. For example, in some embodiments, each storage controller 114 may be coupled to a single associated storage interface 126 via a cable 124. In other embodiments, each storage controller 114 may be coupled to two or more storage interfaces 126 via a plurality of cables 124, thus permitting redundancy as shown in FIG. 1. Storage controllers 114 may also have features supporting shared storage and high availability. For example, in PCIe implementations, a unique PCIe identifier may be used to indicate shared storage capability and compatibility in system 100.

In embodiments in which switches 110 comprise PCIe switches or switches configured in accordance with another communication standard, chassis management controllers 112 may not be able to communicate directly with switches 110. Available chassis management controllers 112 may not be configured in accordance with PCIe or other communication standards available in switches 110, and it may not be desirable to create a proprietary chassis management controller 112 configured in accordance with PCIe or such other communication standards for use in system 100 due to cost concerns. Accordingly, challenges may exist in enabling management functionality of storage devices (e.g., disk drives 130) via chassis management controllers 112 as direct PCIe communications (or communications via another communication protocol) may not be available between Accordingly, a switch management controller 111 may be communicatively interfaced between chassis management controllers 112 and switches 110, and configured to virtualize management communications between chassis management controllers 112 and switches 110 related to management of storage components (e.g., storage controllers 114, disk drives 130) and/or other components of system 100. Switch management controller 111 may, in some embodiments, interface with switches 110 via a private network (e.g., an Ethernet network) internal to chassis 101. In such embodiments, each switch 110 and switch management controller 111 may establish a Transmission Control Protocol/Internet Protocol (TCP/IP) socket for communication. In these and other embodiments, switch management controller 111 may comprise a power PC management processor or processor similar in structure and/or function.

In operation, a chassis management controller 112 may receive a storage management command (e.g., a storage application programming interface (API) call) from a management console or other interface. Chassis management controller 112 may encapsulate such command in a network datagram (e.g., an Ethernet packet, frame, or other datagram) and communicate such datagram via the private network to switch management controller 111. Switch management controller 111 may receive such datagram and extract the command from the datagram. Based on analysis of the command, storage management controller 111 may identify a storage controller 114 associated with the command and execute an input/output control request to such storage controller 114 via an appropriate switch 110. The storage controller 114 may communicate a reply (e.g., a return code) via an appropriate switch to storage management controller 111, which reply storage management controller 111 may encapsulate into a network datagram (e.g., an Ethernet packet, frame, or other datagram) and communicate such datagram via the private network to a chassis management controller 112. The chassis management controller 112 may extract the reply from the datagram and interpret such reply and/or forward the reply to a management console interfaced to the chassis management controller.

As depicted in FIG. 1, a switch 110 may have coupled thereto one or more slots 120. A slot 120 may include any system, device, or apparatus configured to allow addition of one or more expansion cards to chassis 101 in order to electrically coupled such expansion cards to a switch 110. Such slots 120 may comprise any suitable combination of full-height risers, full-height slots, and low-profile slots. A full-height riser may include any system, device, or apparatus configured to allow addition of one or more expansion cards (e.g., a full-height slot) having a physical profile or form factor with dimensions that practically prevent such expansion cards to be coupled in a particular manner (e.g., perpendicularly) to mid-plane 106 and/or switch 110 (e.g., the proximity of information handling resources in chassis 101 prevents physical placement of an expansion card in such manner). Accordingly, a full-height riser may itself physically couple with a low-profile to mid-plane 106, a switch 110, or another components, and full-height cards may then be coupled to full-height slots of full-height riser. On the other hand, low-profile slots may be configured to couple low-profile expansion cards to switches 110 without the need for a full-height riser.

Slots 120 may also include electrically conductive elements (e.g., edge connectors, traces, etc.) allowing for expansion cards inserted into slots 120 to be electrically coupled to switches 110. In operation, switches 110 may manage switching of communications between individual information handling systems 102 and expansion cards coupled to slots 120. In some embodiments, slots 120 may be nonshared (e.g., each slot 120 is associated with a single information handling system 102). In other embodiments, one or more of slots 120 may be shared among two or more information handling systems 102. In these and other embodiments, one or more slots 120 may be configured to be compatible with PCIe, generalized PC bus switch, Infiniband, or other suitable communication specification, standard, or protocol.

Network interface 116 may include any suitable system, apparatus, or device operable to serve as an interface between chassis 101 and an external network (e.g., a local area network or other network). Network interface 116 may enable information handling systems 102 to communicate with the external network using any suitable transmission protocol (e.g., TCP/IP) and/or standard (e.g., IEEE 802.11, Wi-Fi). In certain embodiments, network interface 116 may include a network interface card (NIC). In the same or alternative embodiments, network interface 116 may be configured to communicate via wireless transmissions. In the same or alternative embodiments, network interface 116 may provide physical access to a networking medium and/or provide a low-level addressing system (e.g., through the use of Media Access Control addresses). In some embodiments, network interface 116 may be implemented as a local area network (LAN) on motherboard (LOM) interface.

In some embodiments, various components of chassis 101 may be coupled to a planar. For example, a planar may interconnect switches 110, chassis management controller 112, storage controllers 114, network interface 116, optical media drive 132, KVM interface 134, user interface 136, and/or other modular information handling resources of chassis 101 to mid-plane 106 of system 100. Accordingly, such planar may include slots and/or connectors configured to interconnect with such information handling resources.

Storage interfaces 126 may include any system, device, or apparatus configured to facilitate communication between storage controllers 114 and disk drives 130. For example, a storage interface may serve to permit a relatively small number of communication links (e.g., two) between storage controllers 114 and storage interfaces 126 to communicate with a greater number of disk drives 130. Thus, a storage interface 126 may provide a switching mechanism and/or disk drive addressing mechanism that allows an information handling system 102 to communicate with numerous disk drives 130 via a limited number of communication links and/or channels. Accordingly, a storage interface 126 may operate like an Ethernet hub or network switch that allows multiple systems to be coupled using a single switch port (or relatively few switch ports). A storage interface 126 may be implemented as an expander (e.g., a Serial Attached SCSI (SAS) expander), an Ethernet switch, a FibreChannel switch, Internet Small Computer System Interface (iSCSI) switch, or any other suitable switch. In order to support high availability storage, system 100 may implement a plurality of redundant storage interfaces 126, as shown in FIG. 1.

Disk drive backplane 128 may comprise any system, device, or apparatus configured to interconnect modular storage interfaces 126 with modular disk drives 130. Accordingly, disk drive backplane 128 may include slots and/or connectors configured to receive storage interfaces 126 and/or disk drives 130. In some embodiments, system 100 may include two or more backplanes, in order to support differently-sized disk drive form factors. To support redundancy and high availability, a backplane 128 may be configured to receive a plurality (e.g., 2) of storage interfaces 126 which couple two storage controllers 114 to each disk drive 130.

Each disk drive 130 may include computer-readable media (e.g., magnetic storage media, optical storage media, opto-magnetic storage media, and/or other type of rotating storage media, flash memory, and/or other type of solid state storage media) and may be generally operable to store data and/or programs (e.g., one or more operating systems and/or one or more application programs). Although disk drives 130 are depicted as being internal to chassis 101 in FIG. 1, in some embodiments, one or more disk drives may be located external to chassis 101 (e.g., in one or more enclosures external to chassis 101).

Optical media drive 132 may be coupled to mid-plane 106 and may include any suitable system, apparatus, or device configured to read data from and/or write data to an optical storage medium (e.g., a compact disc (CD), digital versatile disc (DVD), blue laser medium, and/or other optical medium). In certain embodiments, optical media drive 132 may use laser light or other electromagnetic energy to read and/or write data to an optical storage medium. In some embodiments, optical media drive 132 may be nonshared and may be user-configurable such that optical media drive 132 is associated with a single information handling system 102.

KVM interface 134 may be coupled to mid-plane 106 and may include any suitable system, apparatus, or device configured to couple to one or more of a keyboard, video display, and mouse and act as switch between multiple information handling systems 102 and the keyboard, video display, and/or mouse, thus allowing a user to interface with a plurality of information handling systems 102 via a single keyboard, video display, and/or mouse.

User interface 136 may include any system, apparatus, or device via which a user may interact with system 100 and its various information handling resources by facilitating input from a user allowing the user to manipulate system 100 and output to a user allowing system 100 to indicate effects of the user's manipulation. For example, user interface 136 may include a display suitable for creating graphic images and/or alphanumeric characters recognizable to a user, and may include, for example, a liquid crystal display (LCD), cathode ray tube (CRT), a plasma screen, and/or a digital light processor (DLP) projection monitor. In certain embodiments, such a display may be an integral part of chassis 101 and receive power from power supplies (not explicitly shown) of chassis 101, rather than being coupled to chassis 101 via a cable. In some embodiments, such display may comprise a touch screen device capable of receiving user input, wherein a touch sensor may be mechanically coupled or overlaid upon the display and may comprise any system, apparatus, or device suitable for detecting the presence and/or location of a tactile touch, including, for example, a resistive sensor, capacitive sensor, surface acoustic wave sensor, projected capacitance sensor, infrared sensor, strain gauge sensor, optical imaging sensor, dispersive signal technology sensor, and/or acoustic pulse recognition sensor. In these and other embodiments, user interface 136 may include other user interface elements (e.g., a keypad, buttons, and/or switches placed in proximity to a display) allowing a user to provide input to system 100. User interface 136 may be coupled to chassis management controllers 112 and/or other components of system 100, and thus may allow a user to configure various information handling resources of system 100 (e.g., assign individual information handling systems 102 to particular information handling resources).

FIG. 2 illustrates a flow chart of an example method for virtualization of storage services in an integrated chassis, in accordance with certain embodiments of the present disclosure. According to certain embodiments, method 200 may begin at step 202. As noted above, teachings of the present disclosure may be implemented in a variety of configurations of system 100. As such, the preferred initialization point for method 200 and the order of the steps 202-220 comprising method 200 may depend on the implementation chosen.

At step 202, a chassis management controller (e.g., a chassis management controller 112) may receive a storage management command (e.g., a storage application programming interface (API) call) from a management console or other interface communicatively coupled to the chassis management controller and encapsulate the storage management command in a datagram (e.g., an Ethernet packet, frame, or other datagram).

At step 204, the chassis management controller may communicate the datagram to a switch management controller (e.g., switch management controller 111). Such communication may be made over a private network of a chassis housing both of the chassis management controller and the switch management controller. In some embodiments, such communication may be made using TCP/IP.

At step 206, the switch management controller may extract (e.g., decapsulate) the storage management command from the datagram. At step 208, based on analysis of the command, the storage management controller may identify a storage controller (e.g., a storage controller 114) associated with the command. At step 210, the switch management controller may communicate via an appropriate switch (e.g., a switch 110) an input/output control request based on the storage management command to the identified storage controller.

At step 212, the switch management controller may receive from the identified storage controller via an appropriate switch a reply to the input/output control request. At step 214, the switch management controller may encapsulate the storage management command in a datagram (e.g., an Ethernet packet, frame, or other datagram). At step 216, the switch management controller may communicate the datagram to the chassis management controller. Such communication may be made over a private network of a chassis housing both of the chassis management controller and the switch management controller. In some embodiments, such communication may be made using TCP/IP.

At step 218, the chassis management controller may extract (e.g., decapsulate) the reply from the datagram. At step 220, the chassis management controller may communicate the reply to the sender (e.g., a management console) of the storage management controller. After completion of step 220, method 200 may end.

The storage controller 114 may communicate a reply (e.g., a return code) to storage management controller 111, which reply storage management controller 111 may encapsulate into a network datagram (e.g., an Ethernet packet, frame, or other datagram) and communicate such datagram via the private network to a chassis management controller 112. The chassis management controller 112 may extract the reply from the datagram and interpret such reply and/or forward the reply to a management console interfaced to the chassis management controller.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using system 100, components thereof or any other system operable to implement method 200. In certain embodiments, method 200 may be implemented partially or fully in software and/or firmware embodied in computer-readable media.

Although the present disclosure has been described in detail, it should be understood that various changes, substitutions, and alterations can be made hereto without departing from the spirit and the scope of the disclosure as defined by the appended claims.

What is claimed is:

1. A system comprising a switch management controller configured to:
   receive a first datagram having encapsulated therein a storage management command;
   extract the storage management command from the first datagram;
   identify a storage controller associated with the storage management command; and communicate an input/output control request to the storage controller based on the storage management command.

2. The system of claim 1, wherein the switch management controller is housed in a chassis, and the first datagram is received by the switch management controller from a chassis management controller housed in the chassis.

3. A system according to claim 2, the switch management controller configured to receive the first datagram from the chassis management controller via a private network internal to the chassis.

4. The system of claim 2, the command originating from a management console communicatively coupled to the chassis management controller.

5. The system of claim 1, the first datagram comprising an Ethernet frame.

6. The system of claim 1, the switch management controller configured to receive the first datagram via Transmission Control Protocol/Internet Protocol.

7. The system of claim 1, the switch management controller configured to communicate the input/output control request to the storage controller via a switch.

8. The system of claim 7, the switch compliant with Peripheral Component Interconnect Express.

9. The system of claim 1, the switch management controller further configured to:
receive a reply to the input/output control request from the storage controller;
encapsulate the reply in a second datagram; and
communicate the second datagram to an information handling resource from which the first datagram was received.

10. The system of claim 9, wherein the switch management controller is housed in a chassis, and the information handling resource comprises a chassis management controller housed in the chassis.

11. A method comprising:
receiving a first datagram at a switch management controller;
extracting a storage management command from the first datagram;
identifying a storage controller associated with the storage management command; and
communicating an input/output control request from the switch management controller to the storage controller based on the storage management command.

12. The method of claim 11, wherein the switch management controller is housed in a chassis and wherein receiving the first datagram comprises receiving the first datagram from a chassis management controller housed in the chassis.

13. The method of claim 12, the command originating from a management console communicatively coupled to the chassis management controller.

14. The method of claim 12, wherein receiving the first datagram comprises receiving the first datagram via a private network internal to the chassis.

15. The method of claim 11, the first datagram comprising an Ethernet frame.

16. The method of claim 11, wherein receiving the first datagram comprises receiving the first datagram via Transmission Control Protocol/Internet Protocol.

17. The method of claim 11, wherein communicating the input/output control request comprises communicating the input/output control request to the storage controller via a switch.

18. The method of claim 17, the switch compliant with Peripheral Component Interconnect Express.

19. The method of claim 11, further comprising:
receiving a reply to the input/output control request from the storage controller;
encapsulating the reply in a second datagram; and
communicating the second datagram to an information handling resource from which the first datagram was received.

20. The method of claim 19, wherein the switch management controller is housed in a chassis, and the information handling resource comprises a chassis management controller housed in the chassis.

* * * * *